United States Patent
Kim et al.

(10) Patent No.: US 6,288,161 B1
(45) Date of Patent: *Sep. 11, 2001

(54) BARRIER COMPOSITIONS AND ARTICLES MADE THEREFROM

(75) Inventors: Yong Joo Kim; Ray Germonprez; Roger L. Kaas; Atul Mehta, all of Neenah, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/999,901

(22) Filed: Dec. 24, 1997

Related U.S. Application Data

(63) Continuation of application No. 08/142,663, filed on Oct. 25, 1993, now abandoned, which is a continuation-in-part of application No. 07/472,400, filed on Jan. 31, 1990, now Pat. No. 5,281,360.

(51) Int. Cl.$^7$ .......................... C08L 57/00; B29D 22/00; B65D 23/00; C09K 15/00
(52) U.S. Cl. .................. 524/538; 525/371; 252/188.28; 428/35.2; 428/35.4; 428/35.8; 428/36.6; 428/36.92; 428/474.4; 428/480; 428/475.2; 428/483; 428/358; 215/12.1; 215/12.2
(58) Field of Search ................. 252/188.28; 428/358, 428/483, 35.3, 35.4, 35.8, 36.6, 36.92, 474.4, 480, 475.2; 525/371; 524/538; 215/12.1, 12.2

(56) References Cited

U.S. PATENT DOCUMENTS

| | | | |
|---|---|---|---|
| 4,112,146 | 9/1978 | Lazear | 427/54 |
| 4,289,864 | 9/1981 | Van Eenam | 526/235 |
| 4,501,781 * | 2/1985 | Kushida et al. | 428/35 |
| 5,021,515 * | 6/1991 | Cochran et al. | 525/371 |
| 5,034,252 * | 7/1991 | Nilsson et al. | 428/35.8 |
| 5,866,649 | 2/1999 | Hong et al. | 524/538 |
| 5,955,527 | 9/1999 | Cochran et al. | 524/413 |

* cited by examiner

*Primary Examiner*—Joseph D. Anthony
(74) *Attorney, Agent, or Firm*—McDermott, Will & Emery

(57) ABSTRACT

Improved oxygen barrier and oxygen absorbing compositions and structures comprising blends of xylylene group-containing polyamides and cobalt octoate and xylylene group-containing polyamides, polyesters and cobalt octoate are disclosed and claimed. These blends have superior barrier properties and clarity obtained by controlling the degree of orientation and the amount of cobalt. These novel blends are used as single layers and as the core layer in multiple layer films, structures and articles. When used in multiple layer structures, the adjacent layers are comprised of polyesters and/or polyamides. The structures made from the blends of the present invention have a clarity that is superior to structures previously known in the art.

34 Claims, 1 Drawing Sheet

BARRIER COMPOSITIONS AND ARTICLES MADE THEREFROM

This application is a continuation of application Ser. No. 08/142,663 filed Oct. 25, 1993, now abandoned, which is a continuation-in-part of application Ser. No. 07/472,400, filed Jan. 31, 1990, now U.S. Pat. No. 5,281,360 incorporated herein by reference. The present invention relates to further improvements in the composition and articles of application Ser. No. 07/472,400.

A continuation-in-part application Ser. No. 07/761,490 entitled "Improved Barrier Composition and Articles Made Therefrom", was filed on Sep. 18, 1991 as a continuation of application Ser. No. 07/472,400. Application Ser. No. 07/761,490 is incorporated herein by reference.

BACKGROUND OF THE INVENTION

Many products, particularly food products are sensitive to the presence of oxygen and/or the loss or absorption of water. These products are susceptible to deterioration, when packaged, due to oxygen and/or moisture absorption or loss through the wall of the package. Attempts to solve the problem have led to the widespread use of oxygen barriers and/or moisture barriers in packaging materials. Typical moisture barriers include polyethylene and polypropylene. Suitable oxygen barriers include EVOH, PVOH, Nylon and blends thereof. Vinylidene chloride—vinyl chloride copolymers and vinylidene chloride—methyl acrylate copolymers are suitable as both moisture and oxygen barriers.

A problem with conventional barrier materials is that due to their high cost or their unstable structural characteristics or other weaknesses, it is difficult to fabricate commercial packaging solely out of barrier materials. For instance, EVOH, while having superior oxygen barrier properties, suffers moisture problems because of the many hydroxyl groups in the polymer. Other barrier materials are so expensive that to manufacture structures solely from those barriers would be cost prohibitive. Accordingly, it has become a common practice to use multilayer structures, whereby, the amount of expensive or sensitive barrier material may be reduced to a thin layer and an inexpensive polymer can be used on one or both sides of the barrier layer as structural layers. In addition, the use of multilayer structures permits the barrier layer to be protected from deterioration by structural layers on one or both sides of the barrier layer.

Although multilayer structures containing a barrier layer may be cheaper and stronger than a single layer of barrier materials, such structures are more complicated to manufacture than single-layered ones. In addition, multilayer structures comprised of layers of a variety of different materials may be opposed in some instances on environmental grounds, they may be more difficult to recycle since it is often difficult and expensive to separate the layers. In addition, reducing the thickness of the barrier layer in a multilayer structure can reduce the barrier properties of the film. Accordingly, there is a need for a single-layer packaging material with suitable barrier properties but without the cost or structural weaknesses of packaging made solely from a barrier material. There is also a need for additional multilayer structures having improved barrier properties wherein, the barrier material is reduced to a thinner layer and replaced in part by inexpensive structural layers. These structures have the same barrier properties of prior art barriers but at lower cost due to a decrease in the amount of expensive barrier material used.

In addition to barrier properties, it is frequently desirable to use materials which have oxygen absorption capabilities. These oxygen absorption or oxygen scavenging materials are useful in reducing the amount of oxygen that contaminate the product packaged in the container. An example of oxygen scavenging materials and methods of using them is disclosed in U.S. Pat. No. 4,425,410 to Farrell et al, the disclosure of which is hereby incorporated by reference herein. Another useful aspect of oxygen absorbing material is that such materials can reduce residual oxygen which is trapped in the headspace of a container during sealing, thereby preventing it from having a deleterious effect on the packaged products.

A material that is commonly used in packaging applications is polyethylene terephthalate resin, hereinafter referred to as PET. While PET has a number of valuable properties in packaging, it does not have as good a gas barrier property as is frequently required or desired in many applications. For example, although PET has good carbon dioxide barrier properties for soft drinks, it has not been found useful in packaging such products as beer because beer rapidly loses its flavor due to oxygen migration into the bottle. Similar problems are encountered with citrus products, tomato based products and aseptically packed meat. A packaging material with physical properties similar to PET is polyethylene naphthalate (PEN) which is 3–20 times more effective as a barrier but is considerably more expensive.

In order to enhance polyester's gas barrier properties, polyesters have been used in a multilayer structure in combination with a layer having excellent gas barrier properties such as EVOH. However, multilayer structures employing polyester, such as PET, frequently have adhesion problems between the polyester and the barrier layer which frequently leads to delamination over time.

One approach to enhancing the gas barrier property of PET is to use a resin mixture which includes PET and a xylylene group containing polyamide resin. Such resin materials are disclosed in U.S. Pat. No. 4,501,781 to Kushida et al. One of the considerations encountered with such blends accordingly to Kushida is that there is a limit to the amount of xylylene group-containing polyamide resin that may be present in the PET blend. Kushida indicates that amounts of xylylene group-containing polyamide resin greater than 30% by weight causes the container to become a laminated foil structure which is susceptible to exfoliation between the foil layers of the container.

According to Kushida, the permeation of oxygen gas through the walls of a container is less when the container is made wish PET and a xylylene group-containing polyamide than when the container is made solely of PET. Kushida reports that a bottle shaped container made with PET-xylylene group-containing polyamide measured 0.0001 cc of oxygen permeation per day compared to 0.0180 cc of oxygen permeation per day for a container made with PET.

A preferred xylylene group-containing polyamide resin in the present invention is an aromatic polyamide formed by polymerizing meta-xylylene-diamine ($H_2NCH_2$—m—$C_6H_4$—$CH_3NH_2$) with adipic acid ($HO_2C(CH_2)_4CO_2H$). The most preferred such polymer is manufactured and sold by Mitsubishi Gas Chemicals, Japan, under the designation MXD6 or MXD6 nylon.

In U.S. application Ser. No. 07/472,400 to Hong et al., the gas barrier property of polyester is enhanced by blending polyester with xylylene group-containing polyamide and a transition metal catalyst. Preferred embodiments include blends of PET/MXD6/Cobalt and exhibit superior oxygen barrier and oxygen absorption characteristics that were not present in the prior art structures. However, the structures in this invention are not as clear as the prior art structures. Hong discloses that it is believed that the high orientation of the blend increases the surface areas and interface between PET and MXD6 nylon so that there are a greater number of sites at which a reaction or an absorption of oxygen catalyzed by the transition metal catalyst takes place. This increased surface area and interface between PET and MXD6 nylon also causes a change in the refractive characteristics of the materials and results in an increased diffusion of light passing through the structures. The disclosures made in the Hong application are hereby incorporated by reference herein.

In U.S. Pat. No. 4,407,873 to Christensen et al., the need for the proper selection of materials in films used in retort applications is discussed. Common to the requirements of retort pouch packaging is the requirement that the filled and sealed package be subjected to sterilizing conditions of relatively high temperature after the pouch is filled with product and sealed. Typical sterilizing conditions range in severity up to about 275° F. with residence times at that temperature of as much as 30 minutes or more. Such conditions impose severe stresses on the packages. Many packaging structures provide excellent protection for the package contents at less severe conditions. For example, relatively simple packaging structures for packaging requiring the ability to withstand boiling water, such as at 212° F. are readily available from several suppliers. When sterilizing conditions are required, however, most of these packages fail to survive the processing. Typically, problems are encountered with excessive weakening or failure of the heat seals about the periphery of the pouch. Also certain weaknesses or separations may develop between the layers in the multiple layer sheet structure. In addition, the high humidity experienced during the sterilizing process can change the chemical or structural properties of some materials.

While Hong reports improved barrier properties using PET/MXD6/cobalt blends, there is a further need for oxygen barriers of greater clarity. In addition, there is a need for compositions which can he used in retort application in addition to acting as a clear oxygen barrier material. Thus, it is an object of the present invention to provide an improved monolayer barrier structure that satisfies both clarity and retort functions.

It is also an object of the present invention to provide a clear monolayer barrier structure that has barrier properties superior to known barrier materials.

It is a further object of the present invention to provide a multilayer structure having a layer comprising an MXD6/cobalt blend that does not delaminate under conditions of high relative humidity.

DETAILED DESCRIPTION OF THE INVENTION

Figure 1:
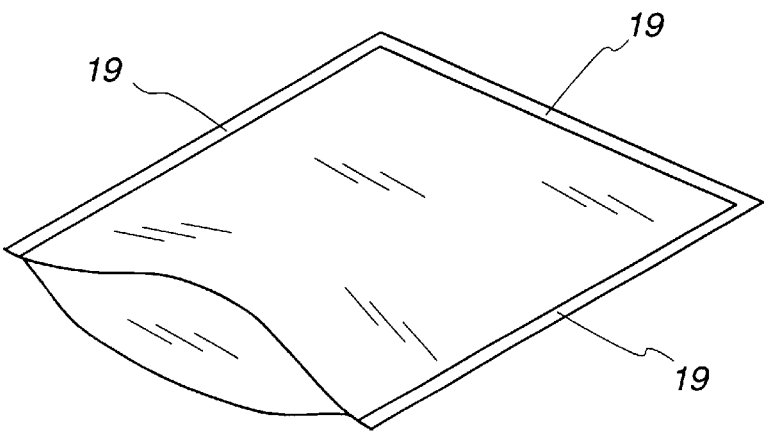
FIG. 1 shows a pouch, sealed on three sides and made with the sheet structure of this invention.

It has been discovered that the oxygen barrier properties of MXD6 nylon are improved by the addition of cobalt octoate and that structures formed from MXD6/cobalt octoate blends and MXD6/cobalt octoate/PET blends have improved clarity and retort characteristics. The blends can be made into structures in the form of containers, films, sheets, pouches or lidstock. When used in a film, the MXD6/cobalt salt blend and the MXD6/cobalt salt/PET blend can be a single layer film or one layer of a multiple layer film which has been coextruded, extrusion coated or laminated.

Although PET is the preferred polyester used in the MXD6/cobalt octoate/polyester blends, any thermoformable grade polyester with oxygen barrier qualities greater than those of polyolefins can be used.

The addition of cobalt octoate to MXD6 nylon, or to a blend of MXD6 nylon and PET, produces blends that are significantly more impervious to oxygen than structures of MXD6 nylon or MXD6 nylon/PET blends. The improved barrier properties of the compositions of the present invention are unaffected by fluctuations of temperature and humidity. The oxygen barrier properties of previously known barrier polymers such as EVOH are adversely affected at 100% relative humidity (RH) and so they must be protected by a moisture barrier polymer. In the present invention, it has been discovered that the addition of cobalt octoate in an amount of up to about 250 ppm to a xylylene group-containing polyamide, preferably MXD6, or a xylylene croup containing polyamide and polyester (preferably PET) blend produces a blend that does not require protection from 100% RH and thus, eliminates the need for a moisture barrier layer.

Structures containing PET/MXD6/Cobalt octoate blends or MXD6/cobalt octoate blends known in the art are oriented to increase oxygen barrier and oxygen absorption. However, such orientation may have a deleterious effect on the color and clarity of the structure. These problems are caused by a change in the refractive index of the materials when the polymers are oriented. Orientation enlarges the domain size of MXD6 so that it is greater than the wavelength of light and this results in the increased scattering of light. See Table 1. In the present invention, knowledge of the processing and orientation characteristics of the MXD6/cobalt octoate blends and MXD6/cobalt octoate/PET blends is utilized to produce clear structures having improved oxygen barrier properties by limiting the degree of orientation so that the MXD6 domain increases in size up to less than the wavelength of light.

TABLE 1

THE EFFECT OF REFRACTIVE INDEX AND PARTICLE SIZE ON HAZE

| ORIENTA-TION DRAWDOWN | REFRAC-TIVE MXD 6 | INDEX PET | PARTICLE SIZE ($\mu$m) | NORMALIZED BLEND HAZE (% HAZE/MIL) |
|---|---|---|---|---|
| 0 | 1.580 | 1.578 | 0.1–0.3 | 0.2 |
| 9 | 1.589 | 1.620 | 2–4 | 0.8 |

The oxygen barrier and oxygen absorbing compositions of the present invention can also be formed into multiple layer structures. These multiple layer structures have a core layer of either a MXD6 nylon/cobalt octoate blend or a MXD6 nylon/polyester/cobalt octoate blend disposed between two adjacent layers. The two adjacent layers are comprised of either a polyester or a polyamide. Also, one adjacent layer can be a polyester and the other adjacent layer can be a polyamide. In preferred embodiments, the polyester is PET and the polyamide is nylon 6. In another preferred embodiment, these structures are orientated to a degree so that the MXD6 domain increases in size up to less than the wavelength of light.

In the present invention, any thermoformable grade polyester with oxygen barrier qualities greater than those of polyolefins, can be used to form clear packages and containers with almost zero oxygen permeability when blended with MXD6 and cobalt octoate. It has been discovered that the problem of haze is solved by extrusion blow molding the blend when it is in a molten state. This minimizes the orientation that occurs when the packages or containers are fabricated. By limiting the orientation, the domain sizes of the polyester and MXD6 do not increase to where they are greater than the wavelength of light and diffusion occurs.

Table 2 shows a comparison of the amount of haze in bottles produced by extrusion blow molding and injection reheat blow molding. The extrusion blow molded bottles display a significant reduction in the percent haze.

TABLE 2

COMPARISON OF THE HAZE OF INJECTION BLOW MOLDED AND EXTRUSION BLOW MOLDED BOTTLES

| BOTTLES | NORMALIZED HAZE (% HAZE/MIL) |
|---|---|
| INJECTION - REHEAT BLOW MOLDED | 3.16 |
| EXTRUSION BLOW MOLDED - MATTE FINISH MOLD | 0.2 |
| EXTRUSION BLOW MOLDED - POLISHED MOLD | 0.12 |

Cast films were prepared using Selar polyester which was blended with MXD6 nylon with and without the addition of cobalt octoate. In the presence of MXD6, these films showed a mild grey color. However, when these films were thermoformed, clear structures were produced. Moreover, haze was significantly reduced by minimizing the degree of orientation. Table 3 shows the normalized % haze/mil of materials compared to haze in injection-reheat blow molded bottles.

TABLE 3

MEASUREMENTS OF % HAZE/THICKNESS (% HAZE/MIL)

| Material | Cast Film Unoriented | Cast Film Formed Into Thermoformed Meat Packages | Injection-Blow Molded Bottles Oriented |
|---|---|---|---|
| Selar PT207 | 0.2 | 0.18 | 0.16 |
| Selar PT207 + 7.5% MXD6 + 120 PPM Cobalt | 0.25 | 0.3 | 3.16 |

The composition of the present invention also comprises a blend of polyester, such as PET, and up to about 30% of a barrier material, such as a xylylene group-containing polyamide with about 49 ppm to about 110 ppm catalyst, most preferably in the form of a nascent catalyst residue from the PET. The barrier material is preferably a xylylene group-containing polyamide resin commonly known as MXD6 nylon which is available from Toyobo or Mitsubishi Gas Chemicals Company. The PET is available from Eastman Hoechst Celanese, ICI America, Shell Chemical or DuPont. The catalyst is a transition metal. Cobalt has been found to be particularly useful in the present invention. Transition metal catalysts are defined as catalyses of metals which have filled or partially filled outer "d" orbitals or are those having filled "d" orbitals and filled or partially filled "p" orbitals.

Multi-layer structures having a barrier layer of MXD6 nylon and two outer layers of PET wherein the MXD6 nylon comprises about 10 wt. % of the total structure will provide a clear film or container. However, the oxygen barrier properties of such multilayer structures are not as good as blends of the present invention. In addition, such multilayer structures will not provide the oxygen absorption capabilities of the present invention.

In blending the polyester with the oxygen barrier material, it is preferable that a physical blend of the pellets be made in a suitable mixing device. The process disperses the particles of the barrier material in the polyester. In one embodiment of the present invention, PET, MXD6 nylon and cobalt salt are mixed together in a screw extruder to form a blend. This extrusion is then oriented to a limited degree by extrusion blow-molding to form a structure such as a container or bottle. When barrier material is blended with polyester, the barrier material is normally present as spherical particles dispersed in PET.

Containers made in accordance with this method are clear, unlike the prior art structures described above. However, these containers exhibit the same superior oxygen barrier and oxygen absorption characteristics of the prior art structures disclosed by Hong. In a second embodiment, a blend consisting of PET, up to about 30 wt. % MXD6 nylon (preferably up to 10 wt. % MXD6 nylon) and up to about 110 ppm cobalt salt is coextruded as a barrier layer with a layer of PET on each surface thereof to form a three layer structure. In a preferred embodiment for example, the barrier layer would be a blend of 10 wt. % MXD6 nylon and the overall percentage of MXD6 nylon in the structure would be about 2 wt. %. Containers made from this structure are clear and do not exhibit the haze found in prior art containers. In addition, the catalyst in the blends of the present invention improves the barrier properties of structures made therefrom by providing oxygen absorption capabilities.

It has been discovered that compositions of blends of a xylylene group—containing polyamide and up to 250 PPM of a transition metal catalyst do not have their oxygen barrier characteristics adversely affected by the high relative humidity conditions experienced during retort. Therefore, they can be used to form films that do not require additional moisture barrier layers. The preferred blends of these compositions are comprised of MXD6 and cobalt octoate and they are used to form the oxygen barrier layer of a single or multiple layer film. When used in a multiple layer film, the barrier layer is disposed between two adjacent layers. One, or both, of the adjacent layers is comprised of a polyester or a polyamide. The preferred polyester is PET and the preferred polyamide is nylon 6. In one embodiment of the present invention, these compositions are oriented to a degree so that the MXD6 domain increases in size up to less than the wavelength of light.

Figure 2:
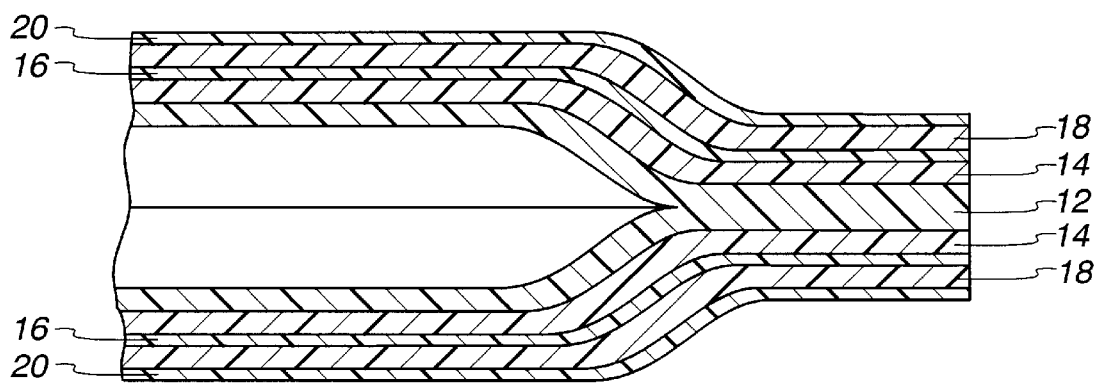
FIG. 2 shows a cross-section of the pouch of FIG. 1 taken at 2—2 of FIG. 1.
Figure 3:
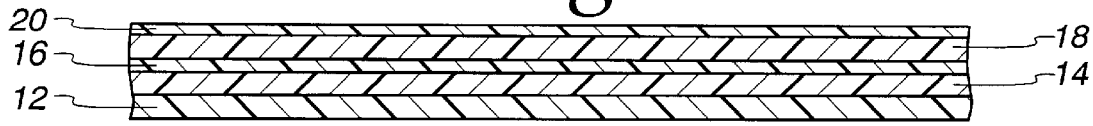
FIG. 3 shows a cross-section of sheet structure used to form the pouch shown in FIGS. 1 and 2.

The invention will now be described in detail and in relation to the drawings. FIG. 1 illustrates a pouch such as is the desired packaging structure of one of the embodiments of this invention. A cross-section of a portion of the pouch is shown in FIG. 2. The sheet material used to make the pouch is seen in FIG. 3. By comparison of FIGS. 2 and 3 it is seen that the FIG. 2 construction consists of two sheet elements of the FIG. 3 construction in face to face relation with the layers 12 joined at the one edge in a heat seal. The pouch is formed by arranging the two sheet elements in face to face relationship and forming heat seals 19 about the common periphery. Alternately, the pouch may be formed by folding a sheet element onto itself and forming heat seals about the edges. Either way the formed pouch appears as shown in FIG. 1.

Referring now to FIGS. 2 and 3, layer 12 is a heat sealable layer comprised of a polyester or a polyamide. Layer 14 is an optional adhesive, or tie layer, selected based on the materials in the adjacent layers. Layer 16 a blend of a xylylene group-containing polyamide and up to 250 ppm of a transition metal catalyst. Layer 18 is also an optional adhesive, or tie, layer and is also selected based on the materials in the adjacent layers. Layer 20 is an outer protective layer comprised of a polyester or a polyamide.

The formed pouch is intended for packaging products which are subjected to a sterilizing process after the product is in the package and the package is sealed. A common sterilizing process is known as autoclave, or retort, processing. In this process, closed and sealed packages are placed in a pressure vessel. Steam and water are then introduced into the vessel at about 275° F. at a sufficiently high pressure to permit maintenance of the desired temperature. The temperature and pressure are usually maintained for about 30 minutes. Finally, the pressure vessel is cooled and the pressure temporarily maintained until the packages cool internally. Finally the pressure is released and the processed packages are removed.

Sheet structures of this invention generally range in thickness from about 3 mils up to about 10 mils. The thickest layer is usually the sealant layer and the thinnest layers usually are the tie layers and the oxygen barrier layer.

The sheet structures of this invention may be made by conventional processes and combinations of processes. The process and its sequences may be selected according to the equipment and polymers available. The specific structure selected and the compositions of the oxygen barrier layer and the outer layers of polyester will be at least partially dependent on the process and its sequences.

Both the orientation and the large amounts of catalysts used in prior art structures frequently had a deleterious effect on haze, color and other properties of the structure. These undesirable effects have been overcome in the present invention by controlling the degree of orientation and limiting the amount of catalyst to levels that do not change the refractive characteristics and color, respectively of the blend materials.

Prior art structures that used cobalt as a catalyst tended to appear green in color. In the present invention, this problem has been solved by controlling the amount of cobalt added to the barrier blend material. The result is an improved structure that is clear and free from the green tint of the prior art structures.

Although the detailed absorption/reaction mechanism is not fully understood, concentrations of about 49 ppm to about 120 ppm residual catalyst in a polyester-barrier material blend, such as a PET-xylylene group-containing polyamide resin blend, have not only superior oxygen barrier properties but also significant oxygen scavenging capabilities.

Thus, in the present invention there is provided a composition having superior oxygen barrier and oxygen absorption characteristics. This composition may be employed as a mono or multilayer film, such as, for example, in a pouch or flexible lidstock. These compositions may also be formed into rigid containers or may comprise the sidewall, body, lid or entire container. Also, the composition of the present invention may be formed into a chip and used in a container as an oxygen scavenger.

A preferred embodiment of the present invention is a blend of PET and MXD6 nylon, wherein the MXD6 nylon is present in an amount of from about 2.5 weight a to about 15 weight % with the balance being PET. Cobalt is present in a range of 49 ppm to about 120 ppm with 62 ppm being most preferable. Another embodiment is pure MXD6 with between 49 and 120 ppm cobalt.

In a more preferred embodiment, the MXD6 nylon is present in an amount of from about 4 weight % to about 10 weight % with the balance being PET. Cobalt is preferably present in the range of from about 49 ppm to about 120 ppm and most preferably present in an amount of about 62 ppm.

In the most preferred embodiment, MXD6 nylon is present in the blend in an amount of about 7.5% with the remainder being PET and cobalt, present in the amounts stated above.

In some PET, nascent cobalt is present as a residual of the PET polymerization catalyst. Specially added cobalt is preferably present as a cobalt salt dispersed in mineral spirits such as that sold under the trademark Nuodex by Huls America. The Nuodex products contain up to about 15% by weight cobalt. The preferred maximum amount of catalyst is about 250 ppm and is dependent on the structure being formed from the PET/MXD6/cobalt blends.

The xylylene group containing polyamide is preferably a MXD6 nylon which is produced by condensation polymerization of metha-xylylene diamine (MXDA) and adipic acid.

In biaxially orienting the blends of the present invention, it is preferred that the degree of orientation not exceed the limit at which the refractive characteristics of the blend materials change and the clarity of the structures deteriorates.

In one of the embodiments of the invention, the multiple layer sheet structures have outer layers comprised of polyesters or polyamides that are suitable for heat sealing.

In another embodiment, an adhesive layer is disposed on one or both sides of the barrier blend layer to bond the polyester or polyamide layers to the blend layer.

One of the embodiments of the present invention relates to the improvement in the clarity of polyester/xylylene group containing polyamide blend bottles through a change in the process rather than a change in the materials used. The preferred blends are comprised of PET and MXD6 nylon. It is known in the art that the color in PET/MXD6 structures is due to the presence of catalyst residue in the polyester. This color can be controlled by limiting the amount of catalyst. Also, the orientation of PET and MXD6 during the manufacturing process (two stage injection—reheat blow molding) results in the development of haze caused by refractive index changes and the enlarged domains of MXD6.

The present invention provides a solution to the problems of color and haze by using the extrusion blow-molding process and extrudable polyester. The preferred polyester is PET. In extrusion blow molding, the bottle is produced when the polymer is in its molten state and therefore, the orientation is minimized. It is believed that the domain size of the unoriented MXD6 is less than the wavelength of light and :he refractive indices of PET and MXD6 are nearly the same. Thus, light passing through unoriented MXD6 structures does not scatter and produce haze.

When multilayer, coextruded bottles are produced the polyester/MXD6/cobalt blend is disposed between two polyester layers. The preferred polyester is PET.

The cobalt octoate is present in an amount of up to 250 ppm. The preferred amount is 120 ppm.

Clear, non-hazy structures with PET/MXD6/cobalt blends have been successfully prepared using the extrusion blow-molding process. Multilayer, coextruded bottles having a core layer of 92.5% PET/7.5% MXD6/120 ppm cobalt were successfully prepared using the process.

EXAMPLE 1

As an example of this invention, cast films consisting of MXD6 nylon and 250 ppm cobalt octoate were prepared in thicknesses from 5 to 35 mils and were tested for oxygen permeations against cast films of MXD6 nylon without cobalt octoate. The results shown below in Table 4 demonstrate the improved oxygen barrier characteristics of films of MXD6 nylon and cobalt octoate.

TABLE 4

| Variable | thickness (mils) | oxygen permeation (ccmil/m*2 day) (green cast films at 0% RH) | | | | |
|---|---|---|---|---|---|---|
| | | 36 (hrs) | 84 | 180 | 276 | 324 |
| I. MXD6 film | 5 | 17 | 15 | 5 | 11 | 12 |
| | 9 | 15 | 13 | 9 | — | — |
| | 19 | 30 | 12 | 12 | — | — |
| | 32 | 93 | 38 | 13 | 7 | 12 |
| II. MXD6 film + 250 ppm Co | 5 | 8 | 3 | 1 | 0.3 | 0.5 |
| | 11 | — | 0 | 0 | — | — |
| | 19 | 23 | 1 | 0 | — | — |
| | 35 | 39 | 0 | 0 | — | — |

EXAMPLE 2

A three layer structure of the present invention having outer layers of PET and a core layer of MXD6 nylon/100 ppm cobalt octoate blend (wherein the core layer comprised 10% of the structure) was used to produce bottles on a Nissei stretch blow molding machine. Other bottles were produced by the same means and from similar material except the core layer did not contain cobalt. After the bottles were aged for three months at 0% relative humidity, they were tested for oxygen permeation. The results are shown below in table 5.

TABLE 5

| Variables | thickness (mils) | oxygen permeation (ccmil/m* 2 day) |
|---|---|---|
| (1) PET/MXD6/PET | 27 | 42 |
| (2) PET/MXD6 + 100 ppm Co/PET | 28 | 9 |

*Oxygen barrier is normalized by total thickness. not by barrier thickness

EXAMPLE 3

Flexible lidstock or pouches can be formed from coextruded film structures in accordance with the present invention having a core layer of a blend of MXD6 nylon and cobalt octoate disposed between two layers of nylon 6. The film was tested before and after retort for oxygen permeation at test conditions of 100% oxygen, 0% relative humidity (RH) and at 100% oxygen, 100% RH. The results are shown below in tables 6 and 7.

TABLE 6

(TEST CONDITIONS: 100% OXYGEN; 0% RH; UNAGED SAMPLE)

| SAMPLE | TOTAL THICKNESS (MILS) | STEADY STATE PERMEATION RATE* |
|---|---|---|
| POST RETORT NYLON 6/1 MIL MXD6+120 PPM Co/NYLON 6 | 3.53 | 6.2 |
| PRE RETORT NYLON 6/2 MIL MXD6+120 PPM Co/NYLON 6 | 4.44 | 0.1 |
| POST RETORT NYLON 6/2 MIL MXD6+120 PPM Co/NYLON 6 | 4.74 | 0.1 |
| PRE RETORT NYLON 6/1 MIL MXD6+250 PPM Co/NYLON 6 | 3.31 | 0.6 |
| POST RETORT NYLON 6/1 MIL MXD6+250 PPM Co/NYLON 6 | 3.38 | 3.2 |
| PRE RETORT NYLON 6/2 MIL MXD6+250 PPM Co/NYLON 6 | 4.50 | 0.0 |
| POST RETORT NYLON 6/2 MIL MXD6+250 PPM Co/NYLON 6 | 4.84 | 0.0 |
| PRE RETORT NYLON 6 | 3.14 | 48.0 |
| POST RETORT NYLON 6 | 2.88 | 39.4 |

*CC/SQ M · DAY · ATM

TABLE 7

(TEST CONDITIONS: 100% OXYGEN; 100% RH; UNAGED SAMPLE)

| SAMPLE | TOTAL THICKNESS (MILS) | STEADY STATE PERMEATION RATE* |
|---|---|---|
| POST RETORT NYLON 6/1 MIL MXD6+120 PPM Co/NYLON 6 | 3.53 | 60.4 |
| PRE RETORT NYLON 6/2 MIL MXD6+120 PPM Co/NYLON 6 | 4.44 | 31.4 |
| POST RETORT NYLON 6/2 MIL MXD6+120 PPM Co/NYLON 6 | 4.74 | 2.6 |
| PRE RETORT NYLON 6/1 MIL MXD6+250 PPM Co/NYLON 6 | 3.31 | 6.6 |
| POST RETORT NYLON 6/1 MIL MXD6+250 PPM Co/NYLON 6 | 3.38 | 22.4 |
| PRE RETORT NYLON 6/2 MIL MXD6+250 PPM Co/NYLON 6 | 4.50 | 2.6 |
| POST RETORT NYLON 6/2 MIL MXD6+250 PPM Co/NYLON 6 | 4.84 | 0.2 |
| PRE RETORT NYLON 6 | 3.14 | 288 |
| POST RETORT NYLON 6 | 2.88 | 314 |

*CC/SQ M · DAY · ATM

What we claim is:

1. An improved oxygen barrier and oxygen absorbing composition comprising a blend of polyester, a xylylene group-containing polyamide and at least about 49 ppm of a transition metal catalyst.

2. A film made from the composition of claim 1.

3. A container made from the composition of claim 1.

4. The composition of claim 1 wherein the transition metal catalyst is present in an amount from about 49 ppm to about 120 ppm.

5. A composition according to claim 1, wherein, the polyester is PET, the polyamide is MXD6 and the catalyst is from about 49 ppm to 120 ppm cobalt.

6. A film made from the composition of claim 5.

7. A container made from the composition of claim 5.

8. A composition according to claim 1, wherein the polyester is PET and the catalyst is cobalt.

9. A film made from the composition of claim 8.

10. A container made from the composition of claim 8.

11. A composition according to claim 1, wherein, the polyamide is MXD6 and the catalyst is cobalt.

12. A film made from the composition of claim 11.

13. A container made from the composition of claim 11.

14. An improved oxygen barrier and oxygen absorbing composition comprising a blend of a polyester with oxygen barrier properties greater than polyolefins, a xylylene group-containing polyamide and at least about 49 ppm of a transition metal catalyst.

15. The composition of claim 14 wherein the transition metal catalyst is present in an amount from about 49 ppm to about 120 ppm.

16. A container made from the composition of claim 14.

17. The composition of claim 14, wherein the polyester is PET, the polyamide is MXD6 nylon and the transition metal is cobalt.

18. A film made from the composition of claim 17.

19. A container made from the composition of claim 17.

20. A method of making an improved oxygen barrier and oxygen absorbing container comprising the steps of:

heating a blend of a polyester, a xylylene group-containing polyamide and at least about 49 ppm of a transition metal catalyst into a molten state; and extrusion blow molding a container from the molten blend.

21. A method according to claim 20 wherein, the polyamide in the blend is MXD6 and the catalyst is cobalt.

22. A method according to claim 20, wherein, the polyester is PET.

23. The method of claim 20 wherein the transition metal catalyst is blended in an amount from about 49 ppm to about 120 ppm.

24. A method according to claim 20, wherein, the polyester is PET, the polyamide is MXD6 and the catalyst is cobalt.

25. A method according to claim 24, wherein, the MXD6 is present in an amount of from about 2.5 wt. % to about 15 wt. % of the blend.

26. A method according to claim 24, wherein, the MXD6 is present in an amount of from about 4 wt. % to about 10 wt. % of the blend.

27. A method according to claim 24, wherein, the MXD6 is present in an amount of from about 2.5 wt. % to about 15 wt. % of the blend and the cobalt is present in an amount of from about 49 ppm to about 120 ppm.

28. A container made by the method of claim 27.

29. A method according to claim 24, wherein, the MXD6 is present in an amount of from about 4 wt. % to about 10 wt. % of the blend and the cobalt is present in an amount of from about 49 ppm to about 120 ppm.

30. A container made by the method of claim 29.

31. A method according to claim 24, wherein, the MXD6 is present in an amount of from about 4 wt. % to about 10 wt. % of the blend and the cobalt is present in an amount of about 62 ppm.

32. A container made by the method of claim 31.

33. A method according to claim 24, wherein, the MXD6 is present in an amount of about 7.5 wt % of the blend and the cobalt is present in the amount of about 62 ppm.

34. A container made by the method of claim 33.

* * * * *